CONFERENCE CIRCUIT FOR CODED SIGNALS PERMITTING CONFERENCE CALLS BETWEEN VOCODER AND ANALOGUE STATIONS

Filed Dec. 16, 1964 5 Sheets-Sheet 1

INVENTORS R. L. MILLER
W. R. YOUNG, JR.
BY Jules P. Kirsch
ATTORNEY

Feb. 13, 1968 R. L. MILLER ETAL 3,369,080

CONFERENCE CIRCUIT FOR CODED SIGNALS PERMITTING CONFERENCE CALLS BETWEEN VOCODER AND ANALOGUE STATIONS

Filed Dec. 16, 1964 5 Sheets-Sheet 4

Feb. 13, 1968 R. L. MILLER ETAL 3,369,080

CONFERENCE CIRCUIT FOR CODED SIGNALS PERMITTING CONFERENCE CALLS BETWEEN VOCODER AND ANALOGUE STATIONS

Filed Dec. 16, 1964 5 Sheets-Sheet 5

United States Patent Office 3,369,080
Patented Feb. 13, 1968

3,369,080
CONFERENCE CIRCUIT FOR CODED SIGNALS PERMITTING CONFERENCE CALLS BETWEEN VOCODER AND ANALOGUE STATIONS

Ralph L. Miller, Chatham, and William Rae Young, Jr., Middletown, N.J., assignors to Bell Telephone Laboratories, Incorporated, New York, N.Y., a corporation of New York Filed Dec. 16, 1964, Ser. No. 418,635
16 Claims. (Cl. 179—18)

ABSTRACT OF THE DISCLOSURE

Interference between coded signals generated by talkers speaking simultaneously is prevented by a circuit which recognizes only one station as a talker at any time and connects the talker station to the receiving apparatus of all other stations by a unidirectional path. At the same time all other stations have access to a second unidirectional path to the talker station and may thus interrupt. Provision is made for conference service among vocoder and nonvocoder stations and among groups of vocoder stations serviced by widely separated switching stations.

This invention relates to conference call equipment, and in particular to equipment for providing conference call service for subscriber stations wherein one or more of the subscriber stations is provided with vocoder apparatus.

Conventional speech communication systems, for example, conventional telephone systems, typically convey human speech by transmitting an electrical facsimile or analogue of the acoustic wave form produced by a human talker. Because of the redundancy of human speech, however, facsimile or analogue transmission is a relatively inefficient way to transmit speech, and it is well known that the information contained in a typical speech sound may be transmitted over a channel of substantially narrower bandwidth than that required for analogue transmission of the speech wave form. A number of arrangements for compressing or reducing the amount of bandwidth employed in the transmission of speech have been proposed, one of these arrangements being the well-known vocoder, a description of which may be found in an article by E. E. David, Jr., entitled, "Signal Theory in Speech Transmission," vol. CT-3, IRE Transactions on Circuit Theory, page 232 (1956).

Vocoders reduce the bandwidth required for speech transmission by transmitting information about selected speech characteristics instead of an electrical analogue of the speaker's acoustic wave form. At a vocoder transmitter station there is derived from an analogue speech signal a coded signal consisting of a group of relatively narrow bandwidth control signals, each representative of one of a number of selected speech characteristics. The combined bandwidth of the control signals that comprise the coded signal is substantially narrower than the bandwidth of the corresponding analogue signal, and therefore the coded signal may be transmitted over a relatively narrow bandwidth channel to the vocoder receiver station. At the vocoder receiver station there is synthesized a replica of the original analogue speech signal from the coded signal.

In areas in which communication service is provided by equipping subscriber stations with vocoder equipment, it is often desired to give services generally available to conventional telephone subscribers, one such service being conference calls. However, in attempting to give conference call service to stations having vocoder equipment, it has been determined that conventional conference call arrangements are not suitable for use by vocoder stations. Thus, in a conventional conference call circuit analogue voice signals from a number of individual subscribers, two or more of whom may be speaking simultaneously, are mixed together on a common bus and the resulting signal mixture is then delivered to all of the subscriber stations; for example, see R. M. Hultberg Patent 3,135,829, issued June 2, 1964. However, mixing on a common bus of the coded signals produced simultaneously by two or more talkers at vocoder stations results in interference between the coded signals, thereby impairing the intelligibility of the speech reconstructed from the coded signal mixture. It has been proposed that interference between coded signals may be eliminated by modifying a conventional conference call circuit to include decoders to convert each talker's coded signal into an analogue signal before mixing together two or more talkers' speech signals, as well as encoders to convert the resulting signal mixture into coded signals to be routed to each conference station. However, it has been determined that it is not satisfactory to put two or more vocoder links in tandem, that is, it is not satisfactory to introduce the decoded signal from one vocoder link into a second vocoder link for re-encoding.

The present invention provides conference call service for stations equipped with vocoders which prevents interference between coded signals from talkers speaking simultaneously by recognizing only one station as a talker at a given time, together with giving all other stations access to interrupt the talking station. This is achieved by providing a conference call arrangement that includes a so-called allotter that recognizes only one subscriber as the talker at a given time, and following this recognition the allotter causes the coded signal from this subscriber to be broadcast over a first unidirectional signal path to which the receivers of all other conference subscribers are connected. At the same time, the receiver of the talking station is connected by the allotter to a second unidirectional path to which the transmitter of one of the listening stations may be connected in the event that one of the listening subscribers wishes to interrupt the talking subscriber. In this fashion, a listening subscriber who wishes to speak is able to communicate a request to interrupt to the talker without interfering with the talker's coded signal which is currently being broadcast to all of the other conference stations. In response to a request to interrupt from a listening subscriber, the talker, by appropriately signalling the allotter, may relinquish to the interrupting subscriber control of the unidirectional broadcast path.

In addition to providing conference call service between vocoder stations, the conference arrangement of the present invention also provides conference call service between vocoder stations and stations equipped with conventional telephone apparatus. This is accomplished by including a vocoder analyzer and synthesizer in the conference circuit, the analyzer serving to convert analogue signals from the telephone stations into coded signals before routing them over either of the unidirectional paths to the vocoder stations, and the synthesizer serving to convert coded signals from the vocoder stations into analogue signals before routing them from either of the unidirectional paths to the telephone stations. In the present invention, it is to be understood that the phrase "analogue signals" includes digital representation of speech such as the digital signals generated in conventional pulse code modulation systems, as well as facsimile representation of speech such as the speech waveform signals generated in conventional telephone systems.

Another feature of this invention is the provision of conference call service for groups of vocoder stations served by widely separated switching centers. In this arrangement, two groups of widely separated vocoder stations are each connected to the conference call circuit provided by their respective switching centers, and each of the two conference call circuits is provided with a trunk circuit for interconnecting the two conference call circuits so that individual subscribers at either station are recognized and connected as talking and interrupting stations in much the same manner that talking and interrupting stations connected to a single conference circuit are recognized and connected. Thus, the trunk circuit includes apparatus for recognizing a subscriber as the talker at both stations and for broadcasting the talker's coded signal over the unidirectional broadcast paths of both conference circuits. Also, each trunk circuit includes apparatus for both recognizing a listening subscriber who wishes to interrupt the talker and for providing a unidirectional path by means of which the interrupting subscriber may communicate a request to interrupt to the talker without interfering with the talker's coded signal, regardless of whether the interrupting station and the talking station are connected to the same conference circuit.

The invention will be fully understood from the following detailed description of the illustrative embodiments thereof taken in connection with the appended drawings, in which.

Figure 1:
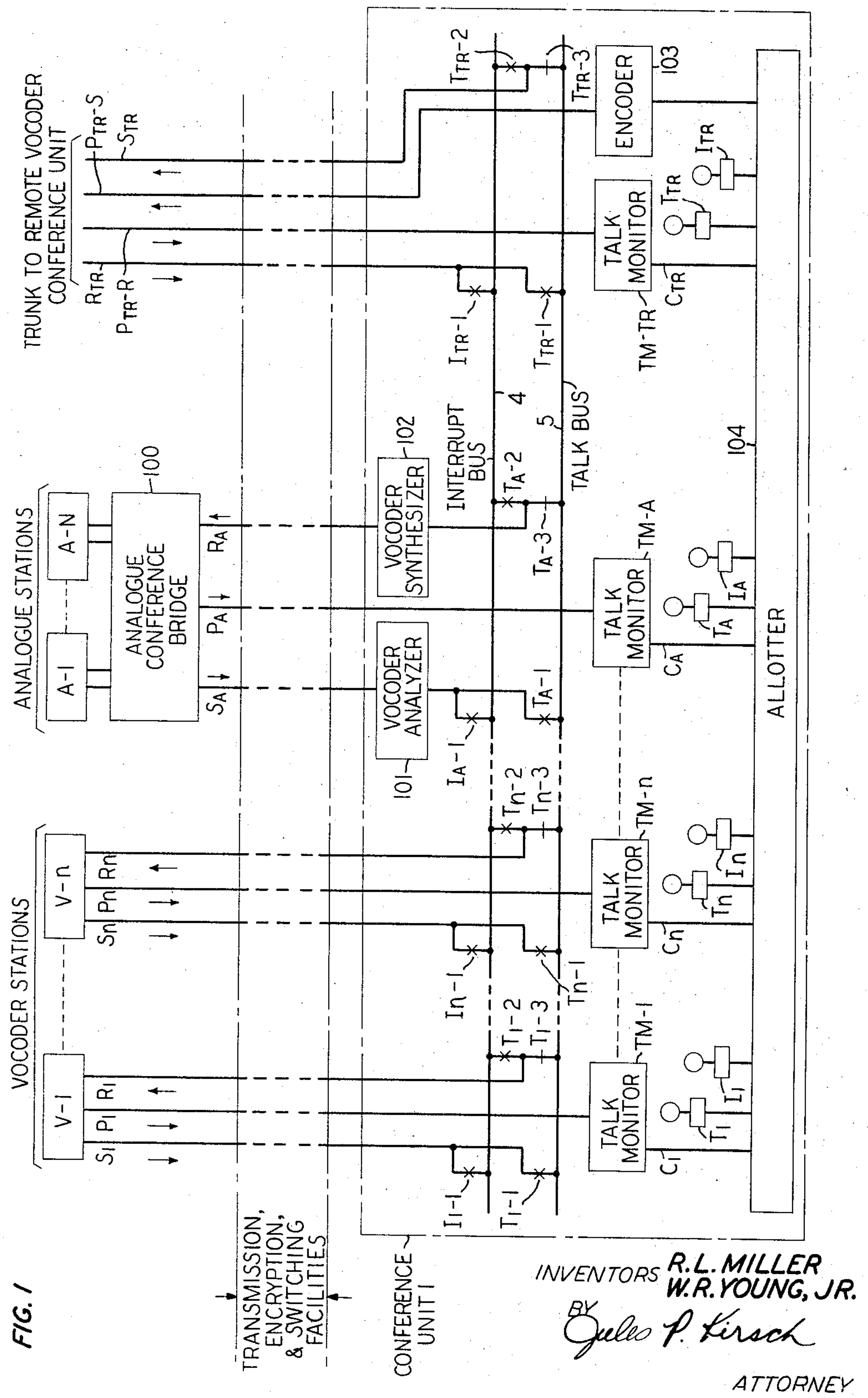
FIG. 1 is a diagram of a conference call circuit embodying the principles of this invention.

FIG. 1 illustrates equipment for establishing conferences between stations in accordance with the principles of the present invention, in which one or more of the stations are equipped with vocoder speech communication apparatus. In this invention, the term "vocoder" is defined to mean a speech bandwidth compression arrangement of the type described by E. E. David, Jr. in "Signal Theory in Speech Transmission," vol. CT-3, IRE Transactions on Circuit Theory, page 232 (1956); for example, the vocoder stations may be provided with channel vocoder equipment. The typical vocoder apparatus at a vocoder station will therefore include both a vocoder transmitter or analyzer for deriving a narrow bandwidth coded signal representing a subscriber's speech in terms of selected speech parameters, and a vocoder receiver or synthesizer for reconstructing intelligible speech from an incoming narrow bandwith coded signal from another subscriber at a distant vocoder station.

Outgoing coded signals from a vocoder station are conveyed over transmission paths or leads denoted S in FIG. 1, and incoming coded signals are conveyed over receiving paths or leads denoted R. In addition, a separate request-to-talk lead denoted P is shown for each station, this lead serving to indicate the mechanism by which a subscriber enters a request to talk during a conference connection. However, as will be explained below, the P leads merely symbolize the request-to-talk function, since any one of a number of different arrangements may be employed to convey a request to talk from a subscriber to the conference equipment of this invention. The broken portions of the S, P, and R leads indicate the transmission, encryption and switching facilities that connect the individual stations with the conference equipment, it being understood that such facilities may be of any desired construction.

*Conferences between vocoder stations only*

The conference equipment provided by this invention is capable of establishing conference connections in a number of different situations. The first situation to be described is that in which a conference is arranged between vocoder stations only. In FIG. 1 this situation is illustrated by the connection of three or more of the vocoder stations V–1 through V–$n$ to conference unit 1, in which for example the $S_1$ lead of vocoder station V–1 is connected to contacts $I_1$–1 and $T_1$–1 of relays $I_1$ and $T_1$, respectively, the $P_1$ lead is connected to talk monitor TM–1, and the $R_1$ lead is connected to the contacts $T_1$–2 and $T_1$–3 of relay $T_1$. It is to be understood that any desired number of stations may be included in a conference, the symbol $n$ signifying any positive integer greater than two.

Prior to the entry of a request to talk from one of the vocoder stations, conference unit 1 is in the idle condition, and all of the T and I relays are in the released or de-energized condition. In this condition all of the receiving paths, $R_1$ through $R_n$, of the vocoder stations are connected through normally closed contacts $T_1$–3 through $T_n$–3 to a first unidirectional path denoted talk bus 5, and normally open contacts $I_1$–1 through $I_1$–$n$ and $T_1$–1 through $T_1$–$n$ prevent any of the vocoder transmission paths $S_1$ through $S_n$ from being connected to either a second unidirectional path denoted interrupt bus 4 or talk bus 5. It is to be understood at this point that relays T and I and other relays to be described below are illustrated symbolically only, and that the functions of these relays may be performed by any one of a number of conventional devices including electronic as well as electromechanical equipment.

When a vocoder station subscriber, for example, a subscriber at station V–1, desires to talk, the subscriber indicates his desire by any one of a number of methods, for example, by actuating a push-to-talk switch or simply by talking. This request is transmitted over lead $P_1$ to the associated talk monitor TM–1, and talk monitor TM–1, after recognizing the request-to-talk signal, conveys this request-to-talk signal over lead $C_1$ to allotter 104. Since it was hypothesized that no other station had been recognized as a talker prior to the request from station V–1, allotter 104 operates or energizes relay $T_1$ in response to the request-to-talk signal from talk monitor TM–1. This closes contact $T_1$–1, thereby connecting lead $S_1$ of station V–1 to talk bus 5 which is connected to the receivers of all other stations via the normally closed contacts mentioned above. Hence the energizing of relay $T_1$ in response to a request to talk from station $V_1$ causes speech signals from station $V_1$ to be routed to receiving paths of all other stations connected to conference unit 1. However, the energizing of relay $T_1$ also closes contacts $T_1$–2 and opens contacts $T_1$–3, thereby disconnecting the receiving path of station V–1 from talk bus 5 and transferring it to interrupt bus 4. This action not only prevents the talker at station V–1 from hearing his own speech sent back to him at full volume and delayed, but also prepares a path so that this talker is able to hear a subscriber at another station who may wish to interrupt him.

If during the speech of the subscriber at station V–1, another subscriber wishes to interrupt, for example, the subscriber at station V–$n$, the V–$n$ subscriber signifies his desire to talk by signalling over lead $P_n$ to talk monitor TM–$n$ which passes this request to talk to allotter 104. In response to the request-to-talk signal from talk monitor TM–$n$, allotter 104 causes relay I$n$ to operate. The operation of relay $I_n$ closes contacts $I_n$–1, thereby connecting the transmission lead $S_n$ of station V–$n$ to the interrupt bus 4 and completing a path from the transmitter of station V–$n$ to the receiver of station V–1. In this manner station V–$n$ is able to communicate directly with station V–1 without interfering with the coded signals from station V–1, and V–1 is able to communicate with V–$n$ together with all of the other stations. This non-interfering two-way communication path between the talking station and the interrupting station permits the talking station to relinquish the talk bus 5 to the interrupting station if the talker so desires. Relinquishment may be accomplished in any one of a number of ways, for example, by releasing a push-to-talk button which is detected by the associated talk monitor TM–1 and conveyed to allotter 104 to release or de-energize relay $T_1$. As explained in detail below, the release of relay $T_1$ allows the request-to-talk signal from the interrupting station to direct allotter 104 to de-energize relay $I_n$ and to energize relay $T_n$, thereby establishing a signal path between lead $S_n$ and the receiving paths of all the other stations via talk bus 5. Thus, allotter 104 is constructed to operate on a "first-come, first-served" basis so that it can recognize and connect only one talking station and one interrupting station concurrently. A station attempting to interrupt after another station has been recognized as an interrupting station is ignored by the allotter 104 and is not connected. Similarly, once a station has been connected as a talking station, a subsequent request to talk from another station is recognized only as a request to interrupt in order to prevent interference with the talker's coded signal.

Figure 2:
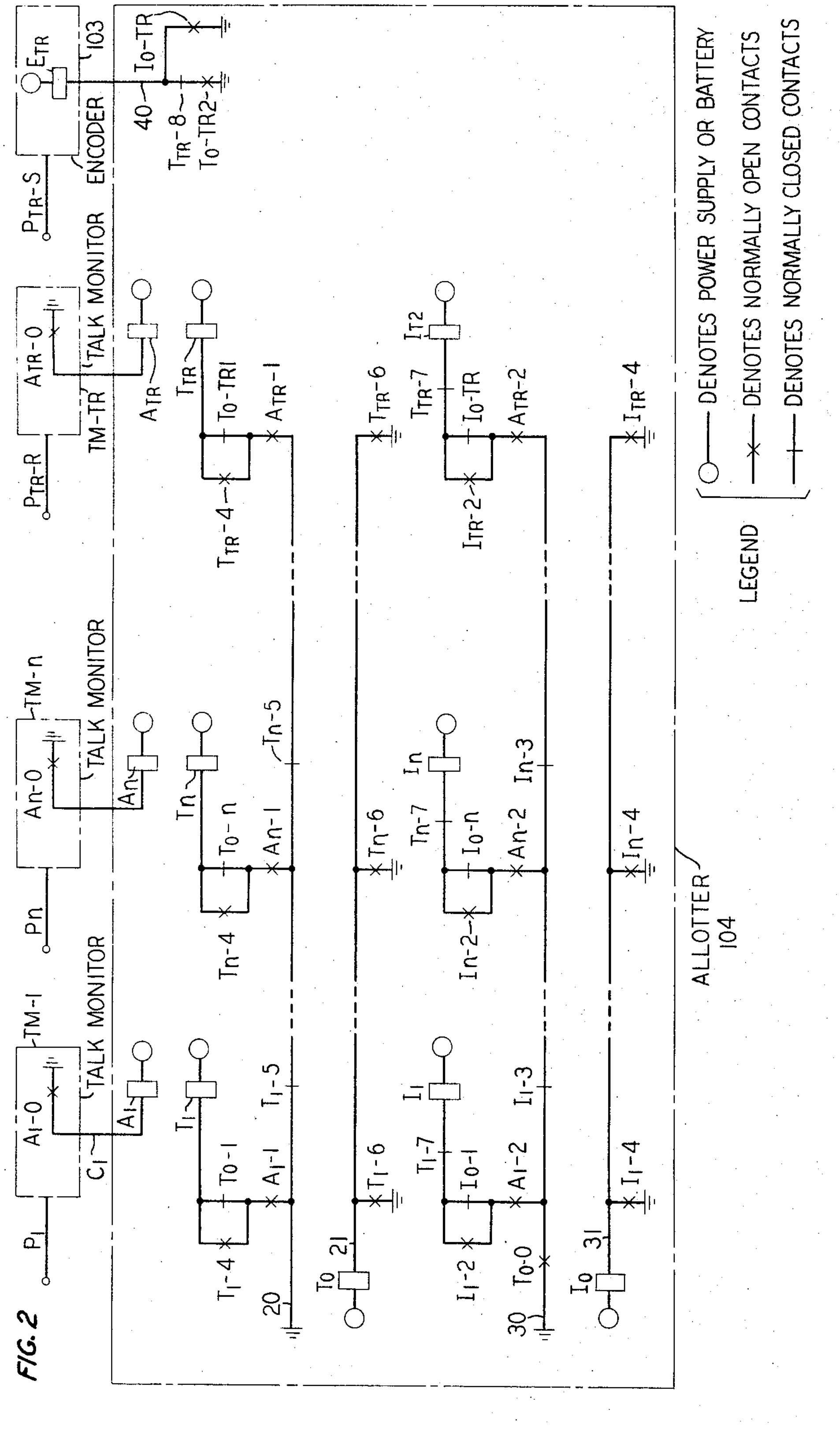
FIG. 2 is a circuit diagram showing in detail a specific embodiment, the allotter circuit of this invention.

It will be helpful at this point to turn to the detailed illustration of allotter 104 in FIG. 2. Within the allotter shown in FIG. 2, all relays A, T and I are initially de-energized. The receipt of a request-to-talk signal from station V–1, as in the previous example, energizes relay $A_1$ by the closing of normally open contacts $A_1$–0 within talk monitor TM–1 which connects a ground path to relay $A_1$. The energizing of relay $A_1$ closes contacts $A_1$–1 and connects ground path 20 to relay $T_1$ through normally closed contacts $T_0$–1 of relay $T_0$, thereby operating relay $T_1$. The energizing of relay $T_1$ closes contacts $T_1$–4 and $T_1$–6, in addition to closing contacts $T_1$–1 and $T_1$–2 shown in FIG. 1. The closing of contacts $T_1$–6 establishes a ground path 21 for the energizing of relay $T_0$ and this in turn opens contacts $T_0$–1 between relay $T_1$ and ground path 20. This sequence of operations does not affect the energized condition of relay $T_1$ by virtue of the previously established path to ground provided by contacts $T_1$–4, but it is observed that the arrangement of open and closed contacts between relay $T_1$ and ground path 20 places relay $T_1$ in a position to be de-energized by the release of relay $A_1$, which is accomplished by the opening of contacts $A_1$–0 in talk monitor TM–1 in response to an appropriate signal from the subscriber at station V–1; for example, the subscriber at station V–1 may release his push-to-talk key. In this fashion, a subscriber at station V–1 is able to relinquish talk bus 5 to a subscriber at another station who wishes to talk.

In addition, the energizing of relay $T_1$ opens normally closed contacts $T_1$–7 between relay $I_1$ and ground path 30. This prevents the inadvertent operation of relay $I_1$ while the subscriber at station V–1 is speaking, which would result in the V–1 subscriber's own speech being sent back to him over interrupt bus 4 due to the closing of contacts $I_1$–1.

It is further observed that the energizing of relay $T_0$ opens normally closed contacts $T_0$–1 through $T_0$–$n$ interposed between each of the T relays and ground path 20, thereby preventing the energizing of any other T relay subsequent to the energizing of a first T relay despite the energizing of one of the other A relays. This feature prevents a subsequent subscriber from interrupting or interfering with the coded signal of a subscriber who has been previously recognized as the talker by the allotter.

Assuming by way of example that a subscriber at station V–1 has been recognized by the allotter as a talker through the energizing of relays $A_1$, $T_1$, and $T_0$, a subscriber at another station, for example, station V–$n$, who wishes to interrupt is placed in two-way communication with the talker at station V–1 in the following manner. The energizing of relay $T_0$ closes normally open contacts $T_0$–0 in ground path 30, thereby permitting the $I_n$ relay to be energized in response to a request-to-talk signal detected by talk monitor TM–$n$ which closes contact $A_n$–0 and thereby energizes relay $A_n$. The energizing of relay $A_n$ closes normally open contacts $A_n$–2 which together with the closing of contacts $T_0$–0 provides a ground path 30 for the energizing of relay $I_n$. As described above in connection with FIG. 1, the energizing of relay $I_n$ connects via contacts $I_n$–1 the transmitting lead $S_n$ of station V–$n$ to the receiving lead $R_1$ of station V–1 by means of interrupt bus 4. As a result of the energizing of relay $I_n$, normally open contacts $I_n$–2 and $I_n$–4 are closed, with the closing of contacts $I_n$–4 providing a ground path 31 to energize relay $I_0$. In turn, the energizing of relay $I_0$ opens all normally closed contacts $I_0$ between the I relays and ground path 30 to prevent the subsequent energizing of any other I relays while station V–$n$ is in two-way communication with the talker at station V–1. Assuming that the talker at station V–1 agrees to allow station V–$n$ to interrupt, contacts $A_1$–0 in talk monitor TM–1 will be opened in response to an appropriate signal from station V–1, thereby releasing relay $A_1$ and relay $T_1$. The de-energizing of relay $T_1$ results in the de-energizing of relay $T_0$, thus establishing a ground path for relay $T_n$ via contacts $T_0$–$n$ and $A_n$–1 over lead 20. The energizing of relay $T_n$ then results in the re-energizing of relay $T_0$ through the closing of normally open contacts $T_n$–6. In addition, the energizing of relay $T_n$ opens normally closed contacts $T_n$–7 in order to de-energize relay $I_n$ and relay $I_0$, and operates the other $T_n$ contacts in a fashion similar to the contacts of $T_1$ described above.

It is noted in path 20 that each set of normally closed contacts $T_1$–5 through $T_n$–5 is opened upon the energizing of the associated relay, $T_1$ through $T_n$, respectively. The purpose of these contacts in path 20 is to give precedence to the lower numbered station in the event that there is a race between two more stations that enter a request to talk at the same time. The assignment of precedence to the lowest numbered station is arbitrary and other priority arrangements may be employed if desired. Normally closed contacts $I_1$–3 through $I_n$–3 in path 30 perform the same function in the event that there is a race between stations that enter a request to interrupt at the same time. Again, other precedence arrangements for interruption may be employed if desired.

*Talk monitors*

As explained above, the function of each talk monitor is to recognize when a subscriber at its associated station enters a request to talk and to convey the request to the allotter. Any one of a number of well-known arrangements may be employed for communicating a request to talk from a station to its respective talk monitor, one such arrangement being a simple push-to-talk system in which the subscriber at the $j$th station, V–$j$, pushes a key which sends a signal to close the contacts denoted $A_j$–0 in the $j$th talk monitor, TM–$j$. Thus the signal that closes the contacts $A_j$–0 may be either an analogue signal sent over a separate lead as shown by leads denoted P in FIG. 1 or an appropriately coded signal sent over transmission leads S and detected by suitable apparatus in each of the talk monitors which distinguishes between a subscriber's speech signals and a request to talk.

Figure 3:
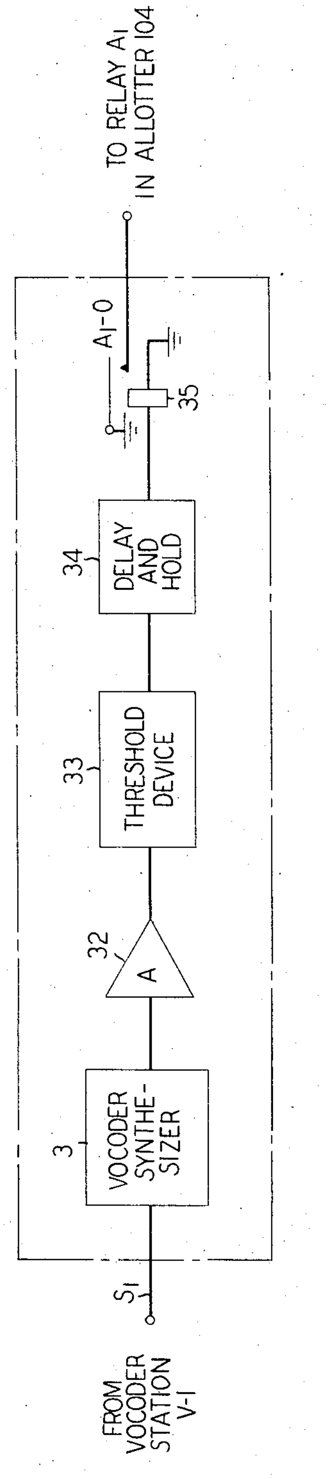
FIG. 3 is a diagram illustrating in detail a component of the conference circuit shown in FIG. 1.

Alternatively, the talker's own coded speech signal may be utilized to indicate a request to talk, as shown in FIG. 3. In this case, the talker's coded voice signal, from vocoder station V–1, for example, is applied via transmission path $S_1$ to the corresponding talk monitor TM–1 which contains a vocoder synthesizer 3 for converting the coded speech signal into an analogue speech signal that is a facsimile of the acoustic waveform of the talker's speech sounds. This analogue signal, after suitable amplification by amplifier 32, is compared against a predetermined threshold in threshold device 33 in order to distinguish between speech and residual noise. If speech is present, the threshold device passes the speech signal to delay and hold circuit 34 which in turn operates relay 35, thereby pulling in contacts $A_1$–0 to complete a ground path for relay $A_1$ in allotter 104. Delay and hold circuit 34 is constructed to have a memory or "hangover time" which is sufficiently long to maintain relay 35 in the operated condition during the intervals between speech syllables, but which is sufficiently short to release relay 35 during greater, nonsyllabic intervals of time between speech sounds.

*Conferences between vocoder and nonvocoder stations*

Up to this point, the operation of the conference apparatus of this invention has been described in terms of the establishment of conference connections between vocoder stations only. However, provision is also made for establishing so-called mixed conferences; that is, for establishing conferences between vocoder and nonvocoder stations. In this invention a nonvocoder station is defined to mean a station provided with conventional speech communication apparatus such as the telephone, this apparatus being designed to transmit and receive an electrical analogue or facsimile of a subscriber's acoustic waveform.

Referring again to FIG. 1, nonvocoder or analogue stations A–1 through A–N are first connected to each other by way of a conventional analogue conference bridge 100, where N may be any positive integer greater than three. Bridge 100 mixes together all of the signals which may appear on its N input leads and sends the resulting signal mixture to each station via N–1 of its output leads, it being understood that a transmitting station will not receive its own signal. In addition, bridge 100 is provided with leads $S_A$, $P_A$, and $R_A$ which are connected to conference unit 1 by conventional transmission and switching facilities indicated by the broken lines. The $P_A$ lead indicates the means by which a subscriber at one of the analogue stations transmits a request to talk to the vocoder conference unit via the associated talk monitor TM–A, where talk monitor TM–A may be of a construction similar to one of the talk monitors previously described. Within allotter 104, a request-to-talk signal conveyed by talk monitor TM–A over lead $C_A$ is treated in exactly the same fashion as a request-to-talk signal from a vocoder station as previously explained.

The $S_A$ and $R_A$ leads respectively represent transmission and receiving paths between bridge 100 and conference unit 1. Within conference unit 1, paths $S_A$ and $P_A$ are respectively connected to a vocoder analyzer 101 and a vocoder synthesizer 102, where analyzer 101 and synthesizer 102 are of the same type as the corresponding vocoder analyzer and synthesizer elements at vocoder stations V–1 through V–*n*. Vocoder analyzer 101 derives a coded signal from an incoming signal sent over lead $S_A$ from one of the analogue stations connected to bridge 100 and passes the coded signal to either talk bus 5 or interrupt bus 4 via contacts $T_A$–1 or $I_A$–1, respectively, depending upon whether the analogue station is recognized by allotter 104 as a talking station or an interrupting station. Correspondingly, a coded signal from one of the vocoder stations is passed through vocoder synthesizer 102 before being passed to bridge 100 in order to convert the coded signal into an analogue or facsimile signal which is intelligible to the analogue stations connected to bridge 100.

Since conference unit 1 transmits only one voice signal at a time to all other stations of the type represented by analyzer 101 and since vocoder analyzers are not well adapted to encode more than one speaker's voice signal at a time, successful administration of a mixed conference between vocoder and nonvocoder stations demands that only one analogue station at a time be permitted to talk. This will require administrative procedures and training of the users at analogue stations which are connected to conference unit 1 by way of an analogue conference bridge, because such a restraint is not required in a conference call established with a conventional analogue conference bridge. It is to be understood, of course, that a single analogue station may be connected directly to conference unit 1 on an individual basis; that is, the analogue conference bridge 100 may be dispensed with in favor of a direct connection from the analogue station to vocoder analyzer 101 and synthesizer 102. Similarly, a number of analogue stations may be connected on an individual basis directly to conference unit 1, but in this case it will be necessary to provide a separate vocoder analyzer and synthesizer pair for each analogue station together with individual equipment for entering a request to talk, as well as individual talk monitors and allotter circuitry.

The allotter circuitry for analogue stations which are connected to conference unit 1 via vocoder analyzer and synthesizer equipment in the manner shown in FIG. 1 is identical with the circuitry provided for vocoder stations, since the mode of operation of the allotter remains the same for both mixed conferences and conferences between vocoders only. Thus within allotter 104 there is contained a separate set of A, T, and I relays for each analogue station or conference bridge, as the case may be, and these relays cooperate with the $T_0$ and $I_0$ relays in exactly the same fashion described above.

*Interconnected vocoder conference units*

An additional feature of the conference equipment of this invention is a provision for interconnecting vocoder conference units located at different switching centers, thus permitting conferences between subscribers served by different switching centers. In this arrangement a separate conference unit is provided at each switching center, and after a separate conference is established at each switching center for the stations served by that center, the conferences at the various switching centers are interconnected by means of a trunk circuit as shown at the right of FIG. 1 and in detail in FIGS. 4A and 4B.

Figures 4A, 5:
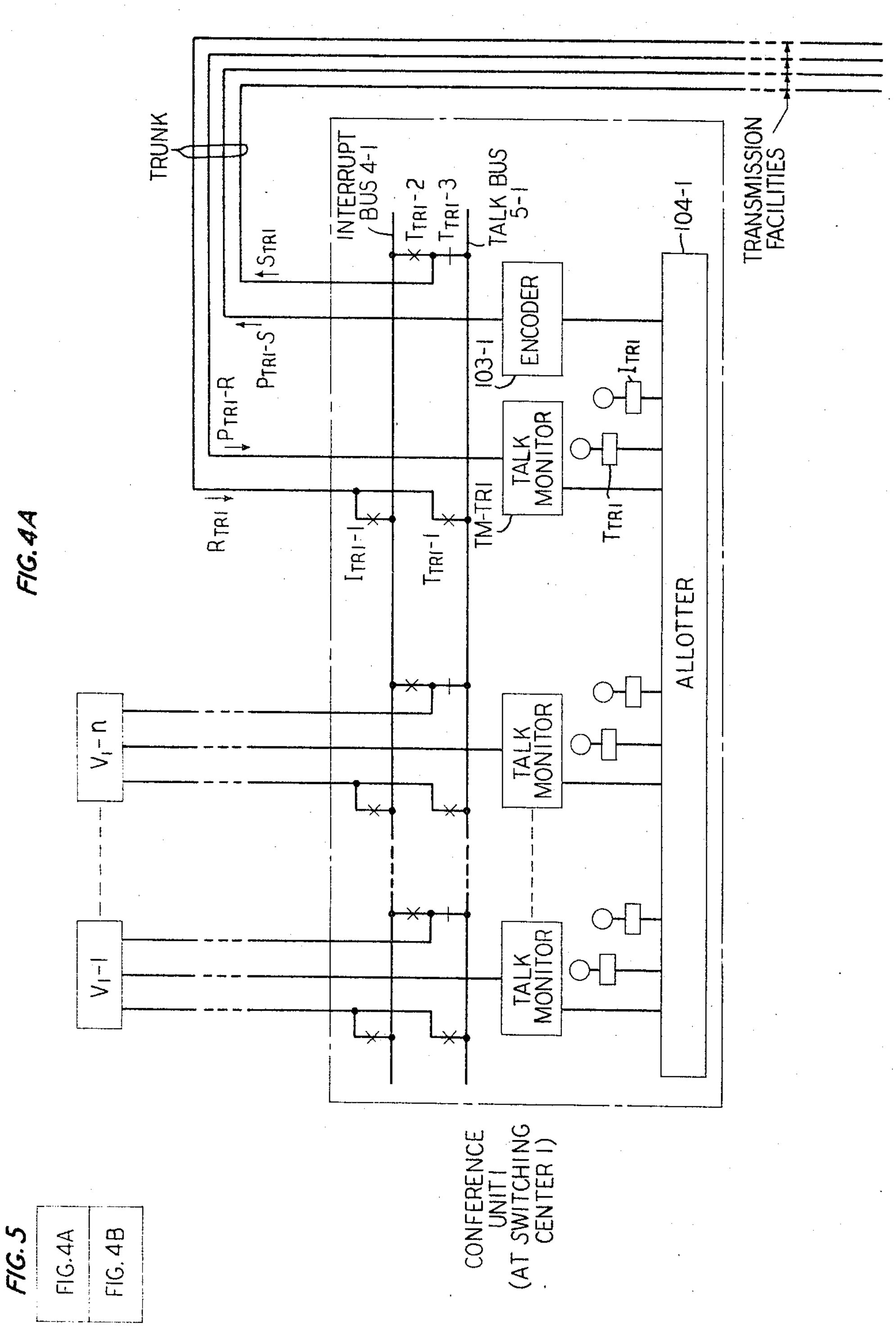
FIGS. 4A and 4B are diagrams illustrating the trunk circuit for interconnecting conference call circuits at widely separated switching centers.
FIG. 5 is a diagram showing the relationship between FIGS. 4A and 4B.
Figure 4B:
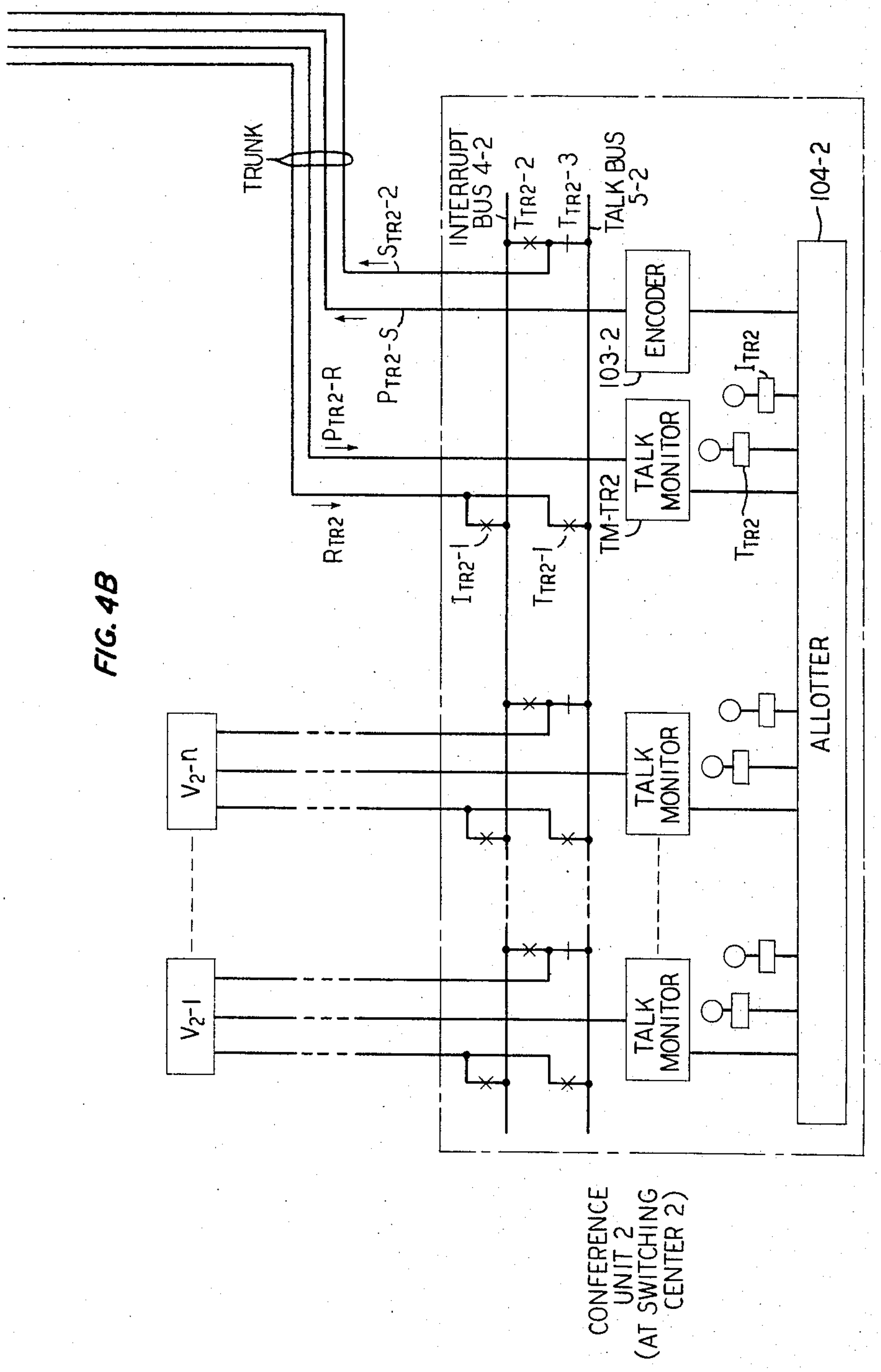

Turning now to FIGS. 4A and 4B, a request-to-talk signal generated by a subscriber, say at station $V_1$–1, connected to conference unit 1 at switching center 1, is not only detected by the associated talk monitor at conference unit 1 but is also transmitted from allotter 104–1 by way of encoder E–1 and lead $P_{TR1}$–S to conference unit 2 at switching center 2. At conference unit 2, the incoming request-to-talk signal from station $V_1$–1 is received over the lead denoted $P_{TR2}$–R and detected by talk monitor TM–TR2. Assuming that none of the local talkers connected to conference unit 2 has entered a request to talk so that conference unit 2 is in the idle condition, the request-to-talk signal conveyed by talk monitor TM–TR2 to allotter 104–2 causes allotter 104–2, as shown in FIG. 2, to energize relay $A_{TR}$ and in turn relay $T_{TR2}$, thereby connecting the receiving leg $R_{TR2}$ of the trunk of conference unit 1 to talk bus 5 by way of contacts $T_{TR2}$–1. In this fashion all of the local stations connected to conference unit 2 will receive the incoming speech signal from the talker at station $V_1$–1 of conference unit 1. At the same time, the transmitting leg of the trunk of conference unit 2, denoted $S_{TR2}$, is connected to interrupt bus 4–2 by the simultaneous closing of contacts $T_{TR2}$–2 and opening of contacts $T_{TR2}$–3 so that any one of the local subscribers connected to conference unit 2 may be connected by allotter 104–2 to interrupt bus 4–2 and thence by way of the trunk circuit for the receiving path of the talker at conference unit 1 in order to request permission to interrupt. At conference unit 1, a request-to-talk signal from an interrupting subscriber at conference unit 2 is received over lead $R_{TR1}$ and passed via talk monitor TM–TR1 to allotter 104–1. Allotter 104–1 places the interrupting subscriber into two-way communication with the talker at conference unit 1 through contacts $I_{TR1}$–1 of relay $I_{TR1}$, which, as described below, are closed in response to a request-to-talk signal from the interrupting subscriber, thereby completing a signal path from the interrupting subscriber via interrupt bus 4–2 and transmission lead $S_{TR2}$ at conference unit 2 to receiving leg $R_{TR1}$ and interrupt bus 4–1 at conference unit 1. The other half of the two-way communication path was previously completed when the subscriber at station $V_1$–1 first entered his request to talk, at which time the transmitting leg of station $V_1$–1 was connected to talk bus 4–1 and thence through normally closed contacts $T_{TR1}$–3 to transmission path $S_{TR1}$ of conference unit 1, and ultimately to receiving path $R_{TR2}$ and talk bus 5–1 of conference unit 2. The transmission facilities used to connect conference unit 1 and conference unit 2, which are indicated in FIG. 4 by broken lines between the various trunk leads, may be of any well-known variety.

The mechanism by which a subscriber is recognized and connected by the allotter as either a talking station or an interrupting station is illustrated by the apparatus at the far right-hand side of the allotter circuitry shown in FIG. 2. Assuming that the trunk circuits of conference units at different switching centers have already been connected, it is apparent that there are two different situations to be handled by the allotter: (1) A subscriber at one conference unit is to be recognized as a talking station by the other conference unit; (2) A subscriber at one conference unit is to be recognized as an interrupting station by the other conference unit. These two situations are in addition to the previously described situation in which the allotter handles requests to talk and interrupt with respect to local stations only.

Considering situation (1), the recognition of a local subscriber as a talker by the allotter shown in FIG. 2, say the subscriber associated with talk monitor TM–1, in addition to producing the sequence of events previously described for relays $A_1$, $T_1$, and $T_0$, also closes normally open contacts $T_0$–TR2 to establish a ground path over lead 40 for the energizing relay $E_{TR}$ in encoder 103. The energizing of relay $E_{TR}$ causes encoder 103 to generate a suitable request-to-talk signal, and this signal, as shown in FIGS. 4A and 4B, is conveyed via the leads denoted $P_{TR}$–S to the distant conference unit. At the distant conference unit, the request-to-talk signal is conveyed by lead $P_{TR}$–R to the associated talk monitor, TM–TR. At talk monitor TM–TR at the distant conference unit, the incoming request-to-talk signal closes the contacts $A_{TR}$–0 and thereby energizes relays $A_{TR}$, $T_{TR}$, and $T_0$. This produces the sequence of events previously described, which results in the establishment of a first communication path between the local subscriber's transmission lead and the receiving leads of all of the subscribers at the distant conference unit, and a second communication path between the distant interrupt bus and the local subscriber's receiving lead.

In situation (2), a request to interrupt is conveyed from a local subscriber to a talker at a distant conference unit by the closing of contacts $I_0$–TR in ground path 40 in response to the energizing of relays A, I, and $I_0$, thereby energizing relay $E_{TR}$ in encoder 103 to transmit a request-to-talk signal to the distant talker. At the distant conference unit, the request-to-talk signal closes contacts $A_{TR}$–0 in talk monitor TM–TR in the trunk circuit, and the closing of these contacts is recognized as a request to interrupt by the distant allotter in the fashion previously explained above. The distant allotter then establishes a path between the interrupting station's transmission lead and the talker's receiving lead by the energizing of relays $A_{TR}$, $I_{TR}$ and $I_0$ so that the interrupting station can speak directly to the talking station without interfering with coded signals transmitted from the talking station.

Although this invention has been described in terms of providing conference call service to vocoder stations, it is to be understood that applications of the principles of this invention are not limited to providing vocoder station conference call service, but include providing conference call service in any situation where it is desired to prevent interference between signals from different talkers speaking simultaneously, or to prevent interference from unwanted signals while a talker is speaking. In addition, it is to be understood that the above-described arrangements are merely illustrative of the numerous arrangements which may be devised for the principles of this invention by those skilled in the art without departing from the spirit and scope of the invention.

What is claimed is:

1. A system for providing conference call service to a plurality of stations including stations equipped with vocoder apparatus, each vocoder apparatus including a transmitter and a receiver for respectively transmitting and receiving coded speech signals, which comprises a plurality of monitors associated with said stations for detecting a request-to-talk signal from said stations, a first unidirectional path for conveying a coded speech signal from the transmitter of a first selected one of said stations to the receivers of all of the other of said stations, a second unidirectional path for conveying a coded speech signal from the transmitter of a second selected one of said stations to the receiver of said first selected station, and an allotter under the control of said plurality of monitors for connecting said stations to said first and second unidirectional paths in accordance with a predetermined priority.

2. A system for providing conference call service to a plurality of stations including both analogue stations connected to a conference bridge, each analogue station being equipped with telephone apparatus for transmitting and analogue speech signals, and vocoder stations each equipped with vocoder apparatus, each vocoder apparatus comprising a vocoder transmitter and an associated vocoder receiver for respectively transmitting and receiving coded speech signals, which comprises a vocoder transmitter and an associated vocoder receiver for respectively converting analogue speech signals from said analogue stations connected to said conference bridge into coded signals for transmission to said vocoder stations and converting coded signals from said vocoder stations into analogue signals for transmission to said conference bridge, a plurity of vocoder station monitors each of which is associated with a corresponding one of said vocoder stations for detecting a request-to-talk signal from its corresponding vocoder station, a conference bridge monitor associated with said conference bridge for detecting a request-to-talk signal from one of said analogue stations connected to said conference bridge, a first unidirectional path for conveying a coded speech signal from a first selected one of said vocoder transmitters to all of said vocoder receivers except the receiver associated with said first selected vocoder transmitter, a second unidirectional path for conveying a coded speech signal from a second selected one of said vocoder transmitters to said receiver associated with said first selected vocoder transmitter, and an allotter under the control of said vocoder station monitors and said conference bridge monitor for connecting said vocoder transmitters and vocoder receivers to said first and second unidirectional paths according to a prearranged priority.

3. First and second conference units for providing conference call service to first and second pluralities of stations served by respective first and second switching centers, each of said pluralities of stations including a plurality of analogue stations connected to a conference bridge, each analogue station being equipped with telephone apparatus for transmitting and receiving analogue speech signals, and a plurality of vocoder stations each equipped with vocoder apparatus, each vocoder apparatus comprising a vocoder transmitter and an associated vocoder receiver for respectively transmitting and receiving coded speech signals, wherein each of said conference units comprises a conference bridge vocoder station including a vocoder transmitter and a vocoder receiver associated with said conference bridge for converting analogue speech signals from said analogue stations connected to said conference bridge into coded signals for transmission to said vocoder stations and converting coded signals from said vocoder stations into analogue signals for transmission to said conference bridge, a plurality of vocoder station monitors each of which is associated with a corresponding one of said vocoder stations for detecting request-to-talk and request-to-interrupt signals from its corresponding vocoder station, a conference bridge monitor associated with said conference bridge for detecting request-to-talk and request-to-interrupt signals from one of said analogue stations connected to said conference bridge, a first unidirectional path for conveying a coded speech signal from a first selected one of said vocoder transmitters to all of said vocoder receivers except the receiver associated with said first selected vocoder transmitter, a second unidirectional path for conveying a coded speech signal from a second selected one of said vocoder transmitters to said receiver associated with said first selected vocoder transmitter, a trunk circuit for connecting said first and second unidirectional paths to the corresponding unidirectional paths of the other one of said conference units, said trunk circuit including a trunk monitor for detecting request-to-talk and request-to-interrupt signals from a vocoder station at the other one of said conference units, and an encoder for delivering coded request-to-talk and request-to-interrupt signals to the other one of said conference units, and an allotter under the control of said vocoder station monitors, said conference bridge monitor, and said trunk monitor for connecting said stations at said first and second conference units to said first and second unidirectional paths according to a prearranged priority.

4. Apparatus as defined in claim 3 wherein said allotter comprises a plurality of switching devices associated with each of said monitors, each of said plurality of switching devices including first and second switching devices respectively associated with said first and second unidirectional paths to transfer coded signals between said stations and said first and second unidirectional paths, and a third switching device connected to said associated monitor and energizable in response to a signal from said associated monitor, wherein the energizing of a third selected switching device causes one of said associated first and second switching devices to be energized.

5. Apparatus as defined in claim 4 wherein said allotter comprises another pair of switching devices respectively associated with said first and second switching devices in each of said plurality of switching devices, the first one of said pair of switching devices being energizable by one of said first switching devices to block the subsequent energizing of any other of said first switching devices as long as a previously energized first switching device remains energized, and the second one of said pair of switching devices being energizable by one of said second switching devices to block the subsequent energizing of any other of said second switching devices as long as a previously energized second switching device remains energized, so that said prearranged priority for connecting said stations to said first and second unidirectional paths comprises recognizing the first station to enter a request-to-talk signal as the talking station and recognizing the first station to enter a request-to-interrupt as the interrupting station.

6. Apparatus as defined in claim 5 wherein said allotter further comprises a first bus provided with a ground point at one end and, spaced along said first bus at successively greater distances from said ground point, a plurality of adjacent connection points in one-to-one correspondence with said monitors, wherein said first switching device associated with each monitor is connectable to said corresponding one of said connection points, and a second bus provided with a ground point at one end and a plurality of adjacent connection points in one-to-one correspondence with said monitors, wherein said second switching device associated with each monitor is connectable to said corresponding one of said connnection points.

7. Apparatus as defined in claim 5 wherein each of said switching devices comprises an electromechanical switching element provided with a two-terminal energizing winding, one of said winding terminals being connected to a source of potential and the other one of said winding terminals being connectable to a ground point, and contact means arranged in combinational contact configurations with selected contact means of other ones of said switching devices for connecting said vocoder stations to said first and second unidirectional paths according to said prearranged priority.

8. Apparatus as defined in claim 7 wherein said combinational contact configurations control the energizing of selected ones of said switching devices so that coded signals from the vocoder station recognized as a talking station are conveyed over said first unidirectional path to all other vocoder stations, and so that coded signals from the vocoder station recognized as an interrupting station are conveyed over said second unidirectional path from said interrupting station to said talking station.

9. Apparatus as defined in claim 8 wherein a first one of said combinational contact configurations comprises a first group of contact means associated with each of said stations including first normally open contact means controlled by the corresponding one of said first switching devices and interposed between the transmitter of said associated station and said first unidirectional path for connecting said transmitter to said first unidirectional path in response to the energizing of said first switching device, second normally open contact means and third normally closed contact means controlled by the corresponding one of said first switching devices and respectively interposed between the receiver of said associated station and said second and first unidirectional paths for respectively connecting the receiver of said associated station to said first unidirectional path in response to the de-energizing of said first switching device and to said second unidirectional path in response to the energizing of said first switching device, and fourth normally closed contact means controlled by the corresponding one of said second switching devices and interposed between said transmitter of said associated station and said second unidirectional path for connecting said transmitter to said second unidirectional path in response to the energizing of said second switching device.

10. Apparatus as defined in claim 8 wherein a second one of said combinational contact configurations comprises a second group of contact means associated with each of said stations and interposed between the other one of said winding terminals of said corresponding first switching device and said corresponding connection point on said first bus including parallel connected first and second contacts including first normally open contact means under the control of said associated first switching device and second normally closed contact means under the control of said first one of said pair of switching devices, and third normally open contact means under the control of said associated third switching device, wherein said parallel connected contacts are interposed between said first switching device and said third contact means and said third contact means is interposed between said parallel connected contacts and said corresponding connection point on said first bus.

11. Apparatus as defined in claim 8 wherein a third one of said combinational contact configurations comprises a plurality of normally closed contact means each of which is associated with a corresponding one of said monitors except said trunk monitor, each of said contact means being individually controlled by the first switching device associated with said corresponding monitor and being individually interposed in said first bus between said corresponding connection point to which said associated first switching device is connectable to said first bus and the next adjacent connection point, wherein that one of several stations entering a request-to-talk signal at the same time is given priority as a talking station which has its corresponding first switching device connectable to said first bus at a connection point separated from said ground point by the least distance.

12. Apparatus as defined in claim 8 wherein a fourth one of said combinational contact configurations comprises a plurality of ground points in one-to-one correspondence with said monitors, and a plurality of normally open contact means each of which is interposed between the other one of said winding terminals of said first one of said pair of switching devices and a corresponding one of said ground points, each of said contact means being controlled by a corresponding one of said first switching devices so that the energizing of any one of said first switching devices closes the corresponding contact means to connect to the corresponding ground point the other one of said winding terminals of said first one of said pair of switching devices, thereby energizing said first one of said pair of switching devices.

13. Apparatus as defined in claim 8 wherein a fifth one of said combinational contact configurations comprises a third group of contact means associated with each of said stations and interposed in the following order from the other one of said winding terminals of said corresponding second switching device to said corresponding connection point on said second bus:

first normally open contact means under the control of said associated first switching device, parallel connected second and third contacts including first normally open contact means under the control of said corresponding second switching device and second normally closed contact means under the control of said second one of said pair of switching devices, and fourth normally open contact means under the control of said associated third switching device.

14. Apparatus as defined in claim 8 wherein a sixth one of said combinational contact configurations comprises a plurality of normally closed contact means each of which is associated with a corresponding one of said monitors except said trunk monitor, each of said contact means being individually controlled by the second switching device associated with said corresponding monitor and being individually interposed in said second bus between said corresponding connection point to which said associated second switching device is connectable to said second bus and the next adjacent connection point, wherein that one of several stations entering a request-to-interrupt signal at the same time is given priority as an interrupting station which has its corresponding second switching device connectable to said second bus at a connection point separated by the least distance from said ground point.

15. Apparatus as defined in claim 8 wherein a seventh one of said combinational contact configurations comprises a plurality of ground points in one-to-one correspondence with said monitors, and a plurality of normally open contact means, each of which is interposed between the other one of said winding terminals of said second one of said pair of switching devices and a corresponding one of said ground points, each of said contact means being controlled by a corresponding one of said second switching devices so that the energizing of any one of said second switching devices closes the corresponding contact means to connect to the corresponding ground point the other one of said winding terminals of said second one of said pair of switching devices, thereby energizing said second one of said pair of switching devices.

16. Apparatus as defined in claim 8 wherein an eighth one of said combinational contact configurations comprises a ground point, a first normally open contact means under the control of the second one of said pair of switching devices, a series-connected pair of contact means including a second normally open contact means under the control of the first one of said pair of switching devices, and a third normally closed contact means under the control of the first switching device associated with trunk monitor, means for connecting said first normally open contact means betwen said ground point and said encoder, and means for connecting said series-connected pair of contact means in parallel with said first normally open contact means between said ground point and said encoder so that said second normally open contact means is adjacent to said ground point and said third normally closed contact means is adjacent to said encoder, thereby energizing a switching device in said encoder to deliver a coded request-to-talk or request-to-interrupt signal to the other one of said conference units.

No references cited.

KATHLEEN H. CLAFFY, *Primary Examiner.*

A. H. GESS, *Assistant Examiner.*